(12) United States Patent
Morelli et al.

(10) Patent No.: US 10,247,107 B2
(45) Date of Patent: Apr. 2, 2019

(54) ACCESSORY GEARBOX FOR GAS TURBINE ENGINE

(71) Applicant: SAFRAN TRANSMISSION SYSTEMS, Colombes (FR)

(72) Inventors: Boris Morelli, Paris (FR); Stéphane Prunera-Usach, Rueil-Malmaison (FR); Julien Viel, Argenteuil (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 15/127,169

(22) PCT Filed: Mar. 19, 2015

(86) PCT No.: PCT/FR2015/050686
§ 371 (c)(1),
(2) Date: Sep. 19, 2016

(87) PCT Pub. No.: WO2015/140476
PCT Pub. Date: Sep. 24, 2015

(65) Prior Publication Data
US 2017/0122214 A1    May 4, 2017

(30) Foreign Application Priority Data

Mar. 21, 2014    (FR) ...................................... 14 52405

(51) Int. Cl.
*F02C 7/32*    (2006.01)
*F16H 1/20*    (2006.01)
(Continued)

(52) U.S. Cl.
CPC ................ *F02C 7/32* (2013.01); *F01D 25/16* (2013.01); *F16H 1/20* (2013.01); *F16H 57/0031* (2013.01);
(Continued)

(58) Field of Classification Search
CPC ...... F16H 57/021; F16H 1/20; F16H 57/0031; F16H 57/0037; F02C 7/06; F02C 7/32;
(Continued)

(56) References Cited

U.S. PATENT DOCUMENTS 3,517,574 A * 6/1970 Glatfelter ................ F16H 3/003
173/170
3,889,780 A * 6/1975 Dison ....................... F02C 7/32
184/109

(Continued)

FOREIGN PATENT DOCUMENTS

DE    10 2011 101 197 A1    11/2012
EP        1 898 072 A1    3/2008
(Continued)

OTHER PUBLICATIONS

International Search Report dated Jul. 31, 2015 in corresponding International Application No. PCT/FR2015/050686, filed Mar. 19, 2015, 2 pages.

(Continued)

*Primary Examiner* — William Kelleher
*Assistant Examiner* — Bobby Rushing, Jr.
(74) *Attorney, Agent, or Firm* — Christensen O'Connor Johnson Kindness PLLC

(57) ABSTRACT

An accessory gearbox capable of driving the accessory devices of a gas turbine engine, such as an aircraft engine. Said accessory gearbox includes a housing and a plurality of gear wheels having axes that are parallel to one another inside the housing. The housing includes a means for attaching the accessory devices to the wall of the housing and driving them, via the gear wheels, through openings in the wall of the housing. The gear wheels are supported in the housing by rolling-element bearings. Each rolling element includes a first ring that is stationary relative to the housing, (Continued)

and a movable ring, secured to the gear wheel, wherein at least one of said gear wheels is supported by a single rolling element.

5 Claims, 2 Drawing Sheets

(51) Int. Cl.
    *F01D 25/16*     (2006.01)
    *F16H 57/00*     (2012.01)

(52) U.S. Cl.
    CPC .... *F05D 2220/323* (2013.01); *F05D 2240/50* (2013.01); *F05D 2260/4031* (2013.01); *F16C 2360/23* (2013.01)

(58) Field of Classification Search
    CPC .. F16C 19/181; F16C 2360/23; F16C 17/035; F16C 33/581; F16C 2326/43; B64D 2041/002; B64D 33/00; B64D 2033/0213; B64D 2033/0273; F05D 2260/4031
    USPC .......................................... 244/54, 55, 58, 60
    See application file for complete search history.

(56) References Cited

U.S. PATENT DOCUMENTS

| | | | | |
|---|---|---|---|---|
| 4,082,139 | A * | 4/1978 | Davis | F16F 15/16 |
| | | | | 165/8 |
| 4,743,776 | A * | 5/1988 | Baehler | F02N 11/04 |
| | | | | 290/22 |
| 6,200,089 | B1 * | 3/2001 | Heer | F04D 29/049 |
| | | | | 415/168.2 |
| 7,108,623 | B2 * | 9/2006 | Cadarette | F16H 55/36 |
| | | | | 474/166 |
| 8,006,501 | B2 * | 8/2011 | Dusserre-Telmon | F02C 7/32 |
| | | | | 60/802 |
| 8,013,488 | B2 * | 9/2011 | Berenger | F02C 7/275 |
| | | | | 310/112 |
| 9,829,087 | B2 * | 11/2017 | Beier | F16H 57/0431 |
| 2006/0107787 | A1 * | 5/2006 | Herlihy | F02C 7/32 |
| | | | | 74/650 |
| 2008/0053257 | A1 | 3/2008 | Dusserre-Telmon et al. | |
| 2016/0146291 | A1 * | 5/2016 | Prunera-Usach | F16H 57/082 |
| | | | | 475/331 |
| 2016/0305331 | A1 * | 10/2016 | Prunera-Usach | F04D 1/00 |

FOREIGN PATENT DOCUMENTS

| | | | | |
|---|---|---|---|---|
| JP | | 2006009929 A | 1/2006 | |
| WO | | 02/053403 A2 | 7/2002 | |
| WO | WO 2016116694 A1 * | | 7/2016 | ............... F02C 7/36 |

OTHER PUBLICATIONS

Written Opinion of the International Searching Authority dated Jul. 31, 2015 in correspoding International Application No. PCT/FR2015/050686, filed Mar. 19, 2015, 6 pages.

* cited by examiner

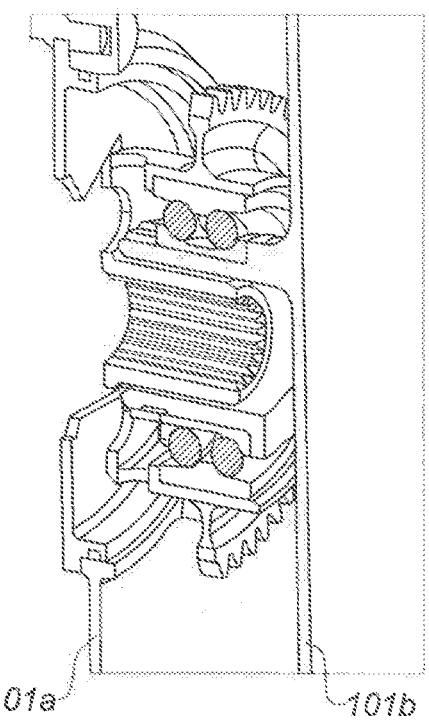
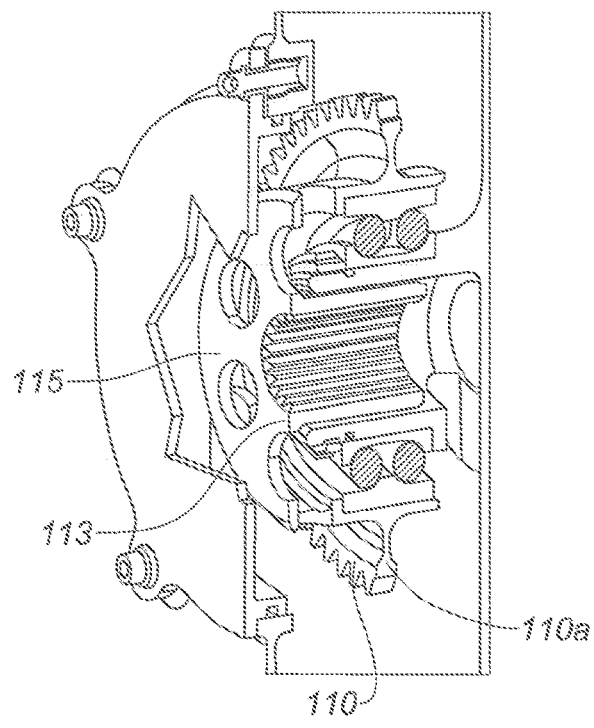
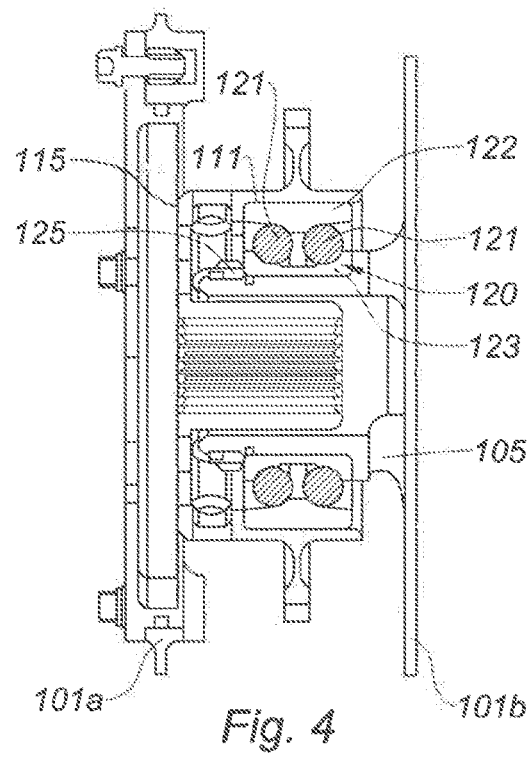

ACCESSORY GEARBOX FOR GAS TURBINE ENGINE

FIELD OF THE DISCLOSURE

The field of the present disclosure is that of turbine engines, in particular that of gas turbine engines intended for aircraft propulsion. Embodiments of the present disclosure relate to housings for driving accessory equipment associated with such turbine engines, generally known by the term "accessory gearbox" and its acronym AGB.

BACKGROUND

Some of the energy generated by the engine is used to drive various items of equipment thereof. The power required is taken off mechanically, generally on the shaft of the high-pressure body of the gas turbine engine, by a take-off shaft that is connected to the shank of the input pinion in the accessory gearbox. The gearbox is mounted on the casing of the engine and contains a certain number of items of equipment or accessories that it supports, for example an electricity generator, an alternator, hydraulic fuel and oil pumps, a starter, etc.

The gearbox comprises an elongate housing inside which gear wheels are mounted forming a gear train driving the equipment. These gears comprise a shank that can be connected to the drive shaft of an item of equipment. One of the gears is also connected to the input shaft of the gearbox. The various apparatuses driven by the gearbox are mounted directly on the housing, and the associated drives pass through the wall of the housing through suitable openings. The gears forming the gear train inside the housing generally have axes parallel to one another. According to the known prior art of the present applicant, the shanks of the pinions are supported firstly by the wall of the housing that is opposite that which comprises the opening through which the equipment is driven, and secondly by the wall comprising the opening or a cover attached to the wall. As a general rule, the shank of the pinions of the gear wheel is carried firstly by the outer race of a rolling or ball bearing fixed to the imperforate bottom wall of the housing and secondly by the outer race of a ball or roller bearing fixed to the cover associated with the accessory. The gear wheel for its part is situated between the two bearings.

The present applicant has already proposed improvements relating to this type of accessory gearbox, described for example in the applications WO 2012/175884 or EP 1.898.072.

Such an arrangement needs a certain amount of space in the direction of the axes of the gears. In the context of the continuous improvement of its products, the present applicant wishes to reduce the space requirement in this direction. It should be noted that roller bearings have a capacity for misalignment that requires a minimum space between axes, and this space between axes limits the possibility of reducing the thickness of the gearboxes. Unless the capacities for misalignment of the rollers are increased and therefore their load capacity reduced, a different solution for assembly must be found.

SUMMARY

In accordance with embodiments of the disclosure, an accessory gearbox that is able to drive the accessory equipment of a gas turbine engine is provided, comprising a housing and a plurality of gear wheels mainly with axes parallel to one another inside the housing, the housing comprising means for the driving thereof by the gear wheels through openings in the wall of the housing, the gears being supported in the housing by roller bearings, each bearing comprising a first race fixed with respect to the housing and a movable race secured to the gear, wherein at least one of the gear wheels is supported by a single roller bearing, the fixed race of which is radially inner and mounted on a shaft secured to the wall of the housing. In some embodiments, the bearing is able to absorb the moments perpendicular to the rotation axis of the gear wheel as well as the axial and radial loads.

By virtue of the use of a roller bearing having this property, the correct functioning of the gearbox is ensured while making it possible to reduce the thickness thereof since the gears are mounted more compactly and a minimum distance between axes is no longer required.

In accordance with an embodiment, the roller bearing has a double row of oblique-contact balls or a double row of oblique-contact rollers. Such a bearing gives the shaft of the accessory good resistance to bending moments and to axial forces with optimum space requirement. In addition, the use of this type of bearing makes it possible to reduce the axial clearances and thus to improve the behaviour of the gearing.

The wall supporting the shaft on which the fixed race is mounted may be on the side opposite the wall having the opening. The inner race of the bearing may be fixed or rotating, the outer race then being rotating or fixed, respectively. For at least one embodiment, the gear wheel comprises a web provided with meshing teeth at its periphery, the web being disposed mainly in the midplane of the bearing.

In accordance with another feature, the wheel is secured to a connection shaft that is able to drive an item of equipment mounted on the housing, the connection shaft being provided with a rotation system, such as internal splines or external splines.

The solution of the disclosure preferably relates to the majority of the gear wheels, which are then each supported by a single bearing.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2 depicts a rear three-quarter view in axial section of a part of the accessory gearbox according to the disclosure;

FIG. 3 depicts the gearbox of FIG. 2 seen in front three-quarters view; and

FIG. 4 depicts a gearbox of FIG. 2 seen from the side.

DETAILED DESCRIPTION

Figure 1:
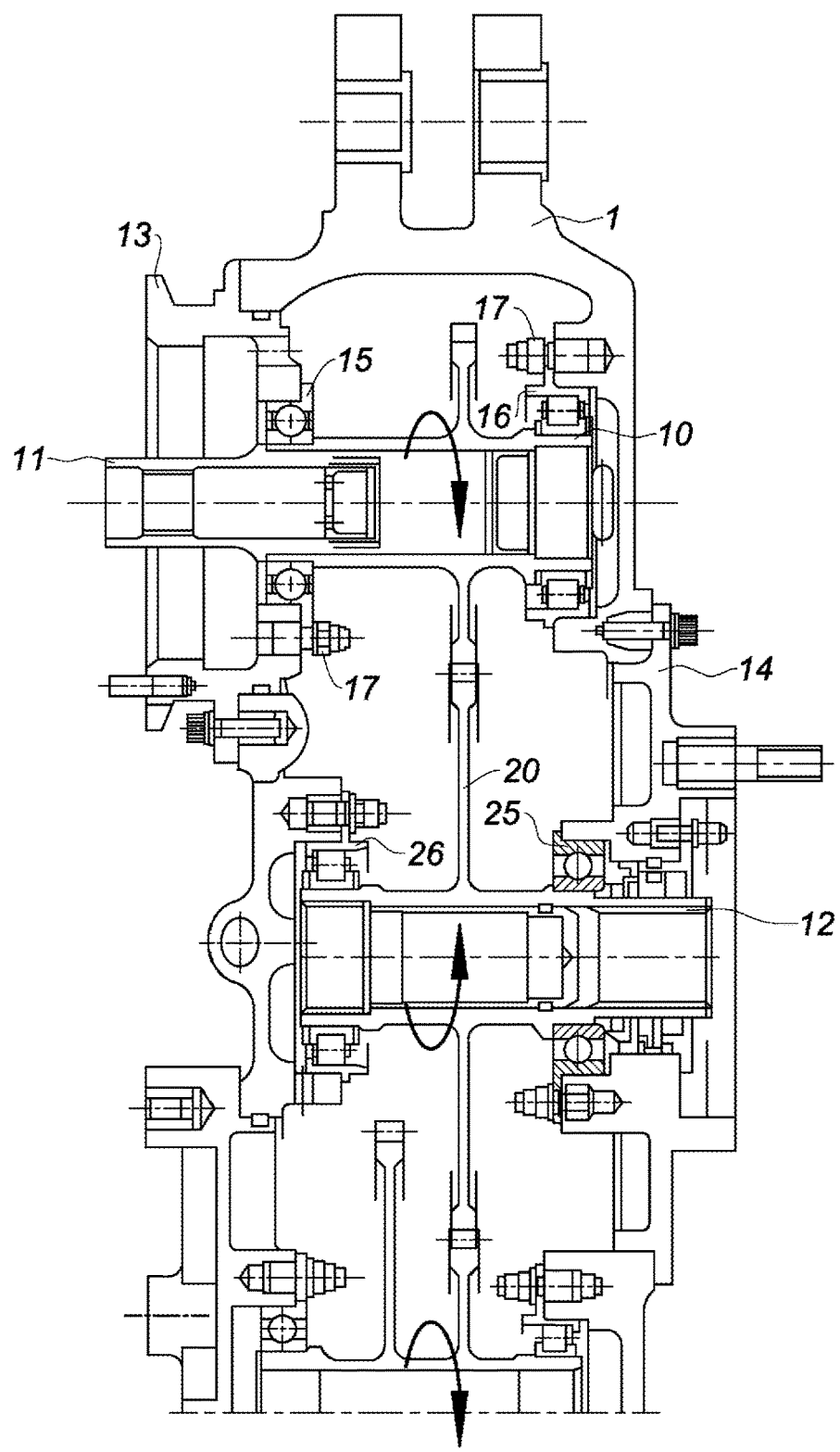
FIG. 1 depicts in axial section a view of part of an accessory gearbox of the prior art.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIG. 1 shows in cross section an end of an accessory gearbox of a turbine engine according to the prior art. It consists of a housing, generally cast and then machined, in which gears are mounted for receiving the pinions used for driving one of the accessories attached to the accessory gearbox. Two pinions are shown in FIG. 1: the first 10 is attached to the input shaft 11 in the AGB and the second pinion comprises internal splines 12 for driving an accessory.

Once the gear wheels are in place in the housing 1, the openings through which the shafts driving the accessories pass are closed by covers so as to ensure that the assembly is fluid-tight and to ensure one of the bearings of the shaft of the gear wheel is supported. In the case of the first gear 10, a cover 13 closes the opening situated on the input shaft 11 side. For the pinion 20, a cover 14 closes the opening through which the first drive shaft passes. It can be seen on the gears that they are carried by bearings: a ball bearing held in place by the cover that closes the opening for the corresponding drive shaft to pass through, and a roller bearing that is fixed to the corresponding bottom wall of the housing 1, that is to say the wall opposite the one in which the opening for the corresponding shaft to pass is formed. The outer race 15 of the ball bearing of the first gear 10 is thus fixed to the input-shaft cover 13 by stud and nut-like means, whereas the outer race 16 of the roller bearing of this same first gear is fixed directly to the bottom of the housing 1, also by stud and nut-like assembly means 17. The same applies to the second gear, in which the outer race 25 of its ball bearing is fixed to the first accessory-drive cover 14 whereas the outer race 26 of its roller bearing is fixed to the corresponding bottom of the housing 1.

According to this prior art, the gear wheels are thus placed between the two bearings by means of which the shaft is supported. This arrangement makes it possible to distribute the load between the bearings but requires a minimum separation between the two bearings and is sensitive to any misalignment between the centering diameters of the bearings of the casing and of the cover. In other applications, the lines may use a roller bearing/rolling bearing-type assembly.

It is found nevertheless that this arrangement makes it necessary to provide a minimum separation between the walls of the housing in order to be able to house the wheel and the two roller bearings on either side of the wheel.

FIGS. 2 to 4 show, at three different angles and in axial half section, a gear wheel mounted in accordance with the disclosure.

The housing 101 of the accessory gearbox 100 according to the disclosure, only part of which is seen at a gear wheel 110, comprises two walls 101a and 101b parallel to and spaced apart from each other for housing the wheel 110. A wall 101a is provided with an opening through which it is possible to access the wheel. A tubular mounting 105 is secured to the bottom wall 101b opposite and facing the opening in the other wall 101a. The gear wheel 110 is rotatably mounted on this mounting 105. The wheel comprises a web 110a with gear teeth at the periphery.

The wheel is mounted on the tubular mounting by means of a roller bearing with a double row of oblique-contact balls. This bearing 120 comprises a double row of balls 121, with oblique contact between an outer race 122 and an inner race 123. For example, the outer race is in a single piece and the inner race consists of two inner half-races, disposed side by side and axially preloaded one against the other during use. According to this embodiment, the outer race 122 comprises a central portion and two lateral portions forming two inner rolling tracks. These tracks are produced in the form of rolling grooves, which rotate about the axis of the bearing and are oriented substantially back to back. The grooves have a circular-arc-shaped radial cross section having their concave shape radially towards the axis of the bearing and each axially laterally towards the outside of the bearing on the side of the lateral part corresponding to the outer race 122 and secured to the hub 111 of the wheel 110.

Each of the inner half races comprises an outer running track. The half-races are symmetrical with respect to a transverse midplane. The two half-races are preloaded axially one against the other, when the bearing is assembled in the use configuration. The outer rolling tracks are in the form of rolling grooves, which also rotate about the bearing axis, and have a circular-arc-shaped radial cross section, the concave shape of each facing radially towards the outside of the bearing and axially towards the outer rolling track of the other inner half race. The outer rolling tracks of the inner race 123 are thus substantially disposed face to face.

The balls 121 of one row are mounted in rolling contact between the outer rolling groove of a first inner half race and the facing inner rolling groove on the outer race 122, while the balls 121 of the other row are mounted in rolling contact between the outer rolling groove of the second inner half race and the facing inner rolling groove on the outer race 122.

The balls 121 are thus mounted with oblique contact, with respect to the midplane of the bearing, which corresponds to the axial contact plane of the inner half-races, when the bearing is preloaded axially on assembly, in the use configuration. Where applicable, ball cages are provided between the two races in order to hold the balls between the rolling tracks.

In this example, the symmetry midplane of the bearing having a double row of balls is also the plane of the web of the wheel. This arrangement has the advantage of reducing the bending moments experiences by the bearing.

The bearing is mounted on the tubular mounting by means of the inner race 123, a nut 125 for example holding the bearing in place, the inner race being preloaded.

According to this embodiment, the gear wheel also comprises a connection extension formed here by a tubular element 113 that may be splined. The tubular connection element is connected to the gear wheel by a transverse plate 115 perforated with a central orifice for giving access to the nut 125 clamping the bearing. In the example depicted in the FIGURES, the opening is closed by a cover no longer supporting a bearing.

The arrangement presented above makes it possible to significantly reduce the width of the power-transmission housing using a set of pinions supported by single bearings. These bearings make it possible to absorb the axial and radial forces and the tilting moments about axes perpendicular to the rotation axis of the wheel.

The roller bearing shown in the FIGURES has a double row of oblique-contact balls. According to another embodiment that is not shown, the bearing has a double row of oblique-contact rollers.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An accessory gearbox that is able to drive accessory equipment of a gas turbine engine comprising:
    a housing and a plurality of gear wheels mounted inside the housing,
    the housing comprising openings in a wall of the housing through which a drive shaft is inserted to connect with at least one of the gear wheels,
    wherein the at least one of the gear wheels is secured to a connection shaft by way of a transverse plate, wherein the connection shaft is arranged coaxially with the gear wheel and receives said drive shaft to drive an item of equipment mounted on the housing,
    wherein at least one of said gear wheels is supported by a single roller bearing having a rotatably fixed inner race mounted on a shaft secured to a wall of the housing and a rotatable outer race secured to a hub of the gear wheel,
    the roller bearing having a double row of oblique-contact balls or a double row of oblique-contact rollers disposed between the rotatable outer race and the fixed inner race, and
    wherein the gear wheel comprises a web provided with gear teeth at its periphery, the web being disposed mainly in the transverse mid-plane of the single roller bearing.

2. An accessory gearbox according to claim 1, wherein the wall supporting the shaft is on the side opposite a wall having an opening configured to provide access to the at least one of said gear wheels.

3. An accessory gearbox according to claim 1, wherein the connection shaft is provided with internal or external splines.

4. An accessory gearbox according to claim 1 wherein a majority of the gear wheels are supported by a single bearing.

5. A turbine engine equipped with an accessory gearbox according to claim 1.

* * * * *